United States Patent [19]

Danick et al.

[11] Patent Number: 5,006,612
[45] Date of Patent: Apr. 9, 1991

[54] POLYESTERS FOR POWDER COATING RESINS USING AN INTERMEDIATE HAVING LOW PROCESS VISCOSITY

[75] Inventors: Charles Danick, Plymouth; K. P. Panandiker, Shorewood, both of Minn.

[73] Assignee: Cargill, Incorporated, Minneapolis, Minn.

[21] Appl. No.: 423,270

[22] Filed: Oct. 18, 1989

[51] Int. Cl.$^5$ .................. C08G 59/42; C08G 63/46
[52] U.S. Cl. ........................... 525/438; 528/112; 528/297; 528/302; 528/304; 525/934; 560/76; 560/84
[58] Field of Search ................ 525/438, 934; 528/112, 528/297, 302, 304

[56] References Cited

U.S. PATENT DOCUMENTS

| 3,397,254 | 8/1968 | Wynstra et al. | 525/438 |
| 3,523,143 | 8/1970 | Kwong | 525/532 |
| 3,548,026 | 12/1970 | Weisfeld et al. | 525/533 |
| 3,624,180 | 11/1971 | Schmid et al. | 525/438 |
| 3,642,938 | 2/1972 | Schmid et al. | 525/438 |
| 4,085,159 | 4/1978 | Marsiat | 525/448 |
| 4,147,737 | 4/1979 | Sein et al. | 428/458 |
| 4,365,046 | 12/1982 | Pesata, Jr. et al. | 525/438 |
| 4,370,452 | 1/1983 | Heater | 525/438 |
| 4,463,140 | 7/1984 | Belder et al. | 525/438 |
| 4,471,108 | 9/1984 | Belder et al. | 528/272 |
| 4,528,341 | 7/1985 | Belder et al. | 525/438 |
| 4,740,580 | 4/1988 | Merck et al. | 525/438 |

FOREIGN PATENT DOCUMENTS 1249271 10/1971 United Kingdom .
1283653 8/1972 United Kingdom .

Primary Examiner—Earl Nielsen
Assistant Examiner—Frederick Krass
Attorney, Agent, or Firm—Fitch, Even, Tabin & Flannery

[57] ABSTRACT

Linear, carboxyl functional polyesters suitable for powder coating compositions which also include polyepoxide cross-linking agents are described.

15 Claims, No Drawings

POLYESTERS FOR POWDER COATING RESINS USING AN INTERMEDIATE HAVING LOW PROCESS VISCOSITY

The present invention relates to novel polyesters and novel powdered coating compositions for use in the preparation of protective films and paints. More particularly, the present invention relates to linear polyesters which have a carboxyl functionality and which provide a polymeric vehicle for powder coating resins with a stable melt viscosity, the polymeric vehicle also providing a coating binder with a glass transition temperature of greater than 50° C.

Powder coatings are widely used. Included in these systems are polyester resins with carboxyl functionality which are cured with epoxy functional cross-linkers. With a vast market for these coatings, and increasing costs of the raw materials going into these resins, a need exists for low cost polyester resins for powder coating compositions which include cross-linkable polyester epoxy resins.

One way to control the cost of producing polyester resins with carboxyl functionality is to reduce the process times used to make the resins, yet maintain clarity and provide water white resins so often sought for coating compositions. To achieve lower process times, low process viscosities are sought.

Hydroxyl terminated polyesters generally are made as an intermediate to be further reacted in a carboxylation reaction to obtain polyesters with carboxyl functionality for powder coatings. Heretofore to limit branching and prohibitively high process viscosities it has been the practice to have low hydroxyl value polyesters with higher viscosities. Polyester resins with relatively low hydroxyl numbers such as below 50 had to be used for subsequent carboxylation. Polyesters with low hydroxyl numbers created difficulties in driving the subsequent carboxylation reaction to completion without using excessive amounts of hydroxyl terminated polyesters. Further, polyesters with low hydroxyl values created difficulties in obtaining a good end point to the carboxylation reaction and clarity of product.

This invention provides linear polyester resins with carboxyl functionality for cross-linking with epoxy functional cross-linkers. In the invention the linear polyester resins with carboxyl functionality are made by carboxylation of a linear first polyester resin. The first polyester resin is the reaction product of terephthalic acid or isophthalic acid and neopentyl glycol and/or cyclohexane dimethanol. The first polyester resin has hydroxyl values in the range of from about 60 to about 100. The hydroxyl groups of the first polyester are carboxylated by reacting the first polyester resin with a linear dicarboxylic acid having not more than nine carbon atoms. Process viscosities and times are kept relatively low because high hydroxyl values contribute to lower molecular weight for this stage. Indeed extremely high process viscosities or even gelling which could result from low hydroxyl values and branching of the polyester resins are completely obviated by the invention. High molecular weight clear polyester resins with carboxyl functionality and water white or low color result. These resins with carboxyl functionality (hereinafter "carboxylated polyester resins") provide a powder which is package stable because they resist reaction and sintering under normal storage conditions. The carboxylated polyester resins also have a stable melt viscosity and provide a formulated coating composition with superior flow properties upon heating without sacrificing package stability. The carboxylated polyester resins which when cross-linked such as by heating or baking with an epoxy resin further provide a coating binder with a glass transition temperature (Tg) of above 50° C.

As used herein "coating binder" is the polymer portion of a coating film which has hardness, adhesion, humidity resistance, impact resistance and other measurable coating film properties. "Polymeric vehicle" means all polymeric and resinous components including cross-linking agents in the formulated coating; i.e. before film formation. Pigments and additives may be mixed with the polymeric vehicle to provide a formulated powder coating composition. The "formulated coating composition" is that which is applied to a substrate and after curing as by baking with a cross-linking agent, a coating film remains. "Coating binder" means the polymeric part of the film after cross-linking.

Acid number or acid value means the number of milligrams of potassium hydroxide required for neutralization of free fatty acids present in 1 g of resin. Hydroxyl number of value which is also called acetyl value is a number which indicates the extent to which a substance may be acetylated; it is the number of milligrams of potassium hydroxide required for neutralization of the acetic acid liberated on saponifying 1 g of acylated sample.

The invention provides a polymeric vehicle for a formulated powder coating composition. The polymeric vehicle comprises a mixture of from about 3.4 to about 17.6 weight percent based upon the total weight of the polymeric vehicle of a polyepoxide, such as triglycidyl isocyanurate (TGIC) and from about 82.4 to about 96.6 based upon the total weight of the polymeric vehicle of a carboxylated polyester resin having an acid value in the range of from about 25 to about 40, preferably about 30 to about 35, and a number average molecular weight in the range of from about 2500 to about 4500, preferably about 3000. The polyepoxide has an average epoxy functionality of not more than about 4 and an epoxy equivalent weight of from about 80 to about 300. As the acid value of the carboxylated polyester decreases, more polyepoxide will be required to provide a suitable cured coating film. When the carboxylated polyester has an acid value in the preferable range of about 30 to about 35, and the polyepoxide curative for use in the invention is triglycidyl isocyanurate, triglycidyl isocyanurate will comprise from about 4.6 to about 7.2 weight percent of the polymeric vehicle and the carboxylated polyester resin will comprise from about 92.8 to about 95.4 weight percent of the polymeric vehicle.

The carboxylated polyester resin is an important aspect of the invention and comprises the reaction product of an aliphatic dicarboxylic acid which has from 2 to 9 carbon atoms and the first polyester having the hydroxyl value in the range of about 60 to about 100 and preferably between about 60 to about 80. The amount of diacid which is reacted with the first polyester is an effective amount for reaction with the hydroxyl groups of the first polyester, which for the purposes of this application means carboxylation of the first polyester, so that an acid value of the carboxylated polyester is in the range of from about 25 to about 40. As the number average molecular weight of the carboxylated polyester and hydroxyl value of the first polyester vary the equivalents of aliphatic diacid to react with the first polyester in accordance with the invention also will very. Table I shows that over a hydroxyl value of 60 to 100, how the equivalents of diacid will vary to carboxylate the first polyester to an acid value of 25 to about 40 and where the number average molecular weight of the carboxylated polyester ranges from about 2500 to about 4000.

hydroxyl value in the range of about 60 to about 100. As seen in Table II, in general for the first polyester to have a hydroxyl value in the range from about 60 to about 80, from about 0.715 to about 0.658 equivalents of terephthalic or isophthalic acid, over a given equivalent range of polyol such as neopentyl glycol or cyclohexane dimethanol are reacted to form the first polyester.

TABLE II

Equivalents of Terephthalic Acid Required To Provide A Hydroxyl Value of 60 to 100 At A Given Polyol Concentration

| Ingredient | Hydroxyl Value | | | | |
|---|---|---|---|---|---|
| | 60 | 70 | 80 | 90 | 100 |
| | Equivalents | | | | |
| Neopentyl glycol (NPG) | .798 | .798 | .798 | .798 | .798 |
| Cyclohexane dimethanol (CHDM) | .004 | .004 | .004 | .004 | .004 |
| Terephthalic acid (TPA) | .715 | .700 | .686 | .672 | .658 |
| Mn (number average) molecular wt. | 1726 | 1496 | 1320 | 1181 | 1068 |
| Acid value | 5 | 5 | 5 | 5 | 5 |
| Resin eq. wt. | 935 | 801 | 701 | 623 | 561 |

Note as the number average molecular weight of the carboxylated polyester increases to 4000, the acid value of that carboxylated polyester narrows for use in the invention.

To facilitate esterification of the terephthalic or isophthalic acid and diol an esterification catalyst such as butylchlorotin dihydroxide, dibutyl tin oxide or hydrated monobutyl tin oxide is used in an amount of

TABLE I

Equivalents of Aliphatic Diacid Over Varying Hydroxyl Values

| Mn For Carboxylated Polyester | AV** | 100 (OH)* EQ DA*** | 90 (OH) AV EQ DA | 80 (OH) AV EQ DA | 70 (OH) AV EQ DA | 60 (OH) AV EQ DV |
|---|---|---|---|---|---|---|
| 2500 | 25 | .152 | .138 | .124 | .110 | .095 |
| | 30 | .168 | .155 | .141 | .127 | .112 |
| | 33 | .179 | .165 | .151 | .137 | .122 |
| | 40 | .202 | .189 | .175 | .161 | .147 |
| 3000 | 25 | .164 | .151 | .137 | .122 | .108 |
| | 30 | .181 | .167 | .154 | .139 | .125 |
| | 33 | .191 | .178 | .164 | .150 | .135 |
| | 37 | .205 | 35 .184 | 35 .171 | 37 .163 | 35 .149 |
| | | | 37 .191 | 37 .178 | | |
| 3500 | 25 | .173 | .160 | .146 | .131 | .117 |
| | 30 | .190 | .176 | .163 | .148 | .134 |
| | 32 | .197 | .183 | .169 | .155 | .141 |
| 4000 | 25 | .180 | .166 | .152 | .138 | .124 |
| | 27 | .187 | — | — | .145 | .130 |
| | 28 | .190 | .176 | .163 | .148 | .134 |

*Hydroxyl value of first polyester.
**Acid value of carboxylated polyester.
***Equivalent of diacid.

As used herein aliphatic dicarboxylic acid means an open chain without branching, saturated or unsaturated acid or anhydride thereof. Suitable diacids include maleic, succinic, adipic and azelaic acids. The carbon chain length of the value of the first polyester affect the Tg of the cured coating film. As the hydroxyl value of the first polyester increases from 60, the carbon chain length of the aliphatic diacid, should be decreased to maintain the Tg of the coating binder. Fumaric acid also may be used as the aliphatic diacid and indeed, the use of fumaric acid is an important aspect of this invention.

The first polyester is the reaction product of not more than about 53 weight percent, based upon the reaction mixture for the first polyester, of terephthalic or isophthalic acid or mixtures thereof and an amount of neopentyl glycol and/or cyclohexane dimethanol which is effective to provide the first polyester with a about 0.05–0.35 weight percent of the total reaction charge.

Processing viscosities are kept relatively low to reduce reaction times. The carboxylated polyester resin has an ICI cone and plate viscosity of about 25 to about 60 poise and preferably about 30 to about 50 poise at 200° C. The first polyester has an ICI cone and plate viscosity in the range of about 8 to about 16 poise and preferably from about 10 to about 12 poise at 175° C.

In a preferred embodiment of the invention, the first polyester is made in two steps to keep the processing viscosity of the reaction mixture lower and provide a check to monitor the extent of reaction of terephthalic acid and diol. In this embodiment the diol is reacted with only part of the terephthalic acid or isophthalic acid (from about 50 to about 75 weight percent of the total terephthalic acid used in the reaction) to form a oligomer. The resulting oligomer then is further reacted with the remaining terephthalic acid to form the first polyester.

After the carboxylated polyester resin is made, it is allowed to cool and solidify. The solidified resin then is crushed or granulated and blended with the polyepoxide along with pigments and other additives to provide a mixture which then may be extruded at from about 80° C. to about 150° C. such as with a PLK 46 Buss Ko-Kneader. The resultant formulated coating composition is cooled, crushed, finely ground and sieved. The resultant formulated powder coating composition may be applied and cured such as by spraying and then baking at from about 160° C. to about 200° C. for about 45 to about 5 minutes.

The following example is provided to illustrate the invention more fully; however, it should not be construed as limiting the scope of the invention, many variations of which are contemplated.

EXAMPLE I

One mole of neopentyl glycol (1536.8 g) is reacted with 0.659 mole of terephthalic acid (1615.2 g) with 0.0056 moles CHDMR-100 (12 g), Fascat 4101 (8.0 g) 7.7, an ICI cone and plate viscosity at 100° C. of 25.6 poise. 0.25 moles of terephthalic acid (538.4 g) are added to and reacted with the oligomer for 400 minutes at 220° C. to produce a high molecular weight first polyester with hydroxyl functionality. The first polyester has a hydroxyl value of 70 with an ICI cone and plate melt viscosity of 12.4 poise at 175° C. and an acid value of 9.75.

The first polyester (3243 g) is reacted with 2.85 moles of fumaric acid (330.5 g) at 200° C. for 270 minutes to produce a high molecular weight carboxylated polyester resin having a number average molecular weight of about 3000, and acid value in the range of 30 to 35 and an ICI cone and plate viscosity of 30 to 50 poise at 200° C.

EXAMPLE II

The following reactants are reacted as described in Example I to provide a first polyester with a hydroxyl value of about 60.

| Reactant | Moles | Wt./Grams |
|---|---|---|
| Neopentyl glycol | .37067 | 38.55 |
| Cyclohexane dimethanol | .02136 | 3.08 |
| Terephthalic acid | .35141 | 58.37 |

The first polyester from the above reaction is reacted with 0.06837 moles (0.1367 equivalent or 6.70 grams) of maleic acid to provide the carboxylated polyester.

EXAMPLE III

The following reactants are reacted as described in Example I to provide a first polyester with a hydroxyl value of about 80.

| Reactant | Moles | Wt./Grams |
|---|---|---|
| Neopentyl glycol | .37433 | 38.95 |
| Cyclohexane dimethanol | .02656 | 3.83 |
| Terephthalic acid | .34461 | 57.24 |

The first polyester from the above reaction is reacted with 0.1694 equivalents of maleic acid (8.3 g) to provide the carboxylated polyester.

A formulated powder coating is prepared as follows.
The powder coating is made by premixing the powder coating ingredients in a high intensity mixer such as a Welex fen 60 sec @ 1,000 RPM & 60 sec @ 2,000 RPM.

The ingredients then are extruded (melt-mix), Zone (1) @ 80° C., Zone (2) 110° C. with 72% load, 300 RPM on a Werner & Pfleiderer ZSK-30.

The extruded product is cooled, ground and sieved.
The powder coating is evaluated by electrostatic spraying it onto 3"×9" 24 gauge C.R.S., with a resulting film of 1.5–1.8 mils.

The film is baked for 10 to 15 minutes @ 360° F.
The following ingredients are made into a formulated powdered coating as described above.

| | Ingredient | Wt. % | Parts Per Hundred |
|---|---|---|---|
| | Carboxylated polyester (Example - I) | 60.0 | 100.0 |
| | Triglycidyl isocyanurate (TGIC) | 4.08 | 6.8 |
| Additives | Flow control agent | 0.8 | 1.33 |
| | Anti pin-holing agent (benzoin) | 0.5 | 0.83 |
| | Titanium dioxide (pigment) | 30.0 | 50.0 |
| | Sparmite barytes (filler) | 4.62 | 7.7 |
| | | 100.0 | |

It should be understood that while certain preferred embodiments of the present invention have been illustrated and described, various modifications thereof will become apparent to those skilled in the art. Accordingly, the scope of the present invention should be defined by the appended claims and equivalents thereof.

What is claimed is:
1. A polymeric vehicle suitable for a powder coating composition which polymeric vehicle when crosslinked provides a coating binder with a Tg greater than 50° C., the polymeric vehicle comprises:
   from about 82.4 to about 96.6 weight percent based upon the weight of the polymeric vehicle, of a carboxylated polyester resin which has an acid value in a range of from about 25 to about 40 and a number average molecular weight in the range of from about 2500 to about 4500,
   from about 3.4 to about 17.6 weight percent based upon the weight of the polymeric vehicle, of a polyepoxide which has an average epoxy functionality of not more than about 4 and an average epoxy equivalent weight in the range of from about 80 to about 300;
   the carboxylated polyester resin comprises the carboxylation reaction product of an aliphatic dicarboxylic acid which has 2 to 9 carbon atoms and a first polyester which has a hydroxyl value from about 60 to about 100, the first polyester having an ICI cone and plate viscosity in the range of from about 8 to about 16 poise at about 175° C., the aliphatic dicarboxylic acid and first polyester being in amounts effective for carboxylation of the first polyester to an acid value in the range of from about 25 to about 40; and the first polyester comprises the esterification reaction product of an aromatic acid selected from the group consisting of terephthalic acid, isophthalic acid and mixtures thereof, and a diol selected from the group consisting of neopentyl glycol, cyclohexane dimethanol and mixtures thereof, the aromatic acid and the diol being in amounts effective for providing the first polyester with a hydroxyl value in the range of from about 60 to about 100.

2. A polymeric vehicle as recited in claim 1 wherein the carboxylated polyester is the reaction product of from about 0.095 to about 0.205 equivalents of the aliphatic diacid and the first polyester comprises the esterification reaction product of the aromatic acid in an amount of not more than about 53 weight percent of the esterification reactants.

3. A polymeric vehicle as recited in claims 1 or 2 wherein the aromatic acid is present in the esterification reaction in an amount of from about 0.715 to about 0.658 equivalents.

4. A polymeric vehicle as recited in claim 1 wherein the diacid in the carboxylation reaction is fumaric acid and the diol in the esterification reaction is neopentyl glycol.

5. A polymeric vehicle as recited in claim 3 wherein the diacid in the carboxylation reaction is fumaric acid and the diol in the esterification reaction is neopentyl glycol.

6. A polymeric vehicle as recited in claim 3 wherein carboxylated polyester resin has an acid value in the range of from about 30 to about 35 and a number average molecular weight of about 3,000.

7. A polymeric vehicle as recited in claim 3 wherein the aromatic acid is terephthalic acid, the first polyester has a hydroxyl value in the range of from about 60 to about 80, the polyepoxide is triglycidyl isocyanurate and the triglycidyl isocyanurate is present in the amount of from about 4.6 to about 7.2 weight percent based upon 25 the weight of the polymeric vehicle.

8. A polymeric vehicle as recited in claim 5 wherein the carboxylated polyester resin has an acid value in the range of from about 30 to about 35 and the first polyester has a hydroxyl value in the range of from about 60 to about 80.

9. A polymeric vehicle as recited in claim 3 wherein the polyepoxide is triglycidyl isocyanurate and the triglycidyl isocyanurate is present in the amount of from about 4.6 to about 7.2 weight percent based upon the weight of the polymeric vehicle.

10. A polymeric vehicle as recited in claims 1 or 2 wherein the aromatic acid is terephthalic acid, the polyepoxide is triglycidyl isocyanurate and the triglycidyl isocyanurate is present in the amount of from about 4.6 to about 7.2 weight percent based upon the weight of the polymeric vehicle.

11. A polymeric vehicle as recited in claim 8 wherein the aromatic acid is terephthalic acid, the polyepoxide is triglycidyl isocyanurate and the triglycidyl isocyanurate is present in the amount of from about 4.6 to about 7.2 weight percent based upon the weight of the polymeric vehicle.

12. A polymeric vehicle as recited in claim 3 wherein the first polyester has an ICI cone and plate viscosity in the range of from about 10 to about 12 poise at about 175° C.

13. A polymeric vehicle as recited in claim 7 wherein the first polyester has an ICI cone and plate viscosity in the range of from about 10 to about 12 poise at about 175° C.

14. A polymeric vehicle as recited in claim 8 wherein the first polyester has an ICI cone and plate viscosity in the range of from about 10 to about 12 poise at about 175° C.

15. A polymeric vehicle as recited in claim 11 wherein the first polyester has an ICI cone and plate viscosity in the range of from about 10 to about 12 poise at about 175° C.

* * * * *